(12) United States Patent
Sapountzis et al.

(10) Patent No.: US 11,529,926 B2
(45) Date of Patent: Dec. 20, 2022

(54) AIRBAG AND AIRBAG MODULE FOR A MOTOR VEHICLE HAVING SUCH AN AIRBAG

(71) Applicant: ZF AUTOMOTIVE SAFETY GERMANY GMBH, Aschaffenburg (DE)

(72) Inventors: Stefan Sapountzis, Erlenbach a. Main (DE); Bartolomeu Franco, Viana do Castelo (PT); Tiago Cardoso, Caminha (PT); Dominik Schütz, Heimbuchenthal (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 16/977,500

(22) PCT Filed: Mar. 6, 2019

(86) PCT No.: PCT/EP2019/055504
§ 371 (c)(1),
(2) Date: Sep. 2, 2020

(87) PCT Pub. No.: WO2019/170708
PCT Pub. Date: Sep. 12, 2019

(65) Prior Publication Data
US 2021/0053526 A1 Feb. 25, 2021

(30) Foreign Application Priority Data
Mar. 6, 2018 (DE) .................... 20 2018 101 242.8

(51) Int. Cl.
| | | |
|---|---|---|
| *B60R 21/233* | (2006.01) | |
| *B60R 21/2338* | (2011.01) | |
| *B60R 21/203* | (2006.01) | |
| *B60R 21/263* | (2011.01) | |

(52) U.S. Cl.
CPC .......... *B60R 21/233* (2013.01); *B60R 21/203* (2013.01); *B60R 21/2338* (2013.01);
(Continued)

(58) Field of Classification Search
CPC . B60R 21/233; B60R 21/231; B60R 21/2338; B60R 21/263; B60R 21/203;
(Continued)

(56) References Cited

U.S. PATENT DOCUMENTS 3,733,091 A * 5/1973 Fleck .................... B60R 21/231
280/729
3,752,501 A 8/1973 Daniel et al.
(Continued)

FOREIGN PATENT DOCUMENTS

DE 3833888 4/1990
DE 3833889 4/1990
(Continued)

*Primary Examiner* — Keith J Frisby
(74) *Attorney, Agent, or Firm* — Tarolli, Sundheim, Covell & Tummino LLP

(57) ABSTRACT

The invention relates to an airbag (14) for unfolding between a vehicle part (10) and a vehicle occupant (18), comprising an impact wall (20) which, in the installed and unfolded state of the airbag (14), faces a vehicle occupant (18) and a circumferential wall (22) which is connected to the impact wall (20) and, in the installed and unfolded state of the airbag (14), extends between the impact wall (20) and the vehicle part (10), wherein the circumferential wall (22) is made with multiple layers, at least in some sections, and forms at least one annular tube (23) which delimits an annular inflatable first airbag volume (V1), and wherein a radially inner layer (26) of the circumferential wall (22), together with the impact wall (20), delimits an inflatable second airbag volume (V2) that is separate from the first
(Continued)

airbag volume (V1). The invention further relates to an airbag module (12) having such an airbag (14).

20 Claims, 1 Drawing Sheet

(52) U.S. Cl.
CPC ... *B60R 21/263* (2013.01); *B60R 2021/23308* (2013.01); *B60R 2021/23316* (2013.01); *B60R 2021/23324* (2013.01); *B60R 2021/23382* (2013.01); *B60R 2021/2633* (2013.01)

(58) Field of Classification Search
CPC .......... B60R 21/26; B60R 2021/23324; B60R 2021/23332; B60R 2021/23382; B60R 2021/2633; B60R 2021/23115; B60R 2021/23308; B60R 2021/23316
USPC ......... 280/729, 731, 743.1, 743.2, 738, 736, 280/742
See application file for complete search history.

(56) References Cited

U.S. PATENT DOCUMENTS

| | | | |
|---|---|---|---|
| 3,907,327 A * | 9/1975 | Pech | B60R 21/231 280/729 |
| 3,929,350 A * | 12/1975 | Pech | B60R 21/231 280/729 |
| 5,358,273 A | 10/1994 | Onishi et al. | |
| 5,372,381 A * | 12/1994 | Herridge | B60R 21/2644 280/743.1 |
| 5,529,337 A | 6/1996 | Takeda et al. | |
| 5,577,765 A | 11/1996 | Takeda et al. | |
| 6,341,800 B1 | 1/2002 | Pausch | |
| 7,891,705 B2 * | 2/2011 | Dennis | B60R 21/233 280/743.1 |
| 8,240,705 B2 * | 8/2012 | Ishida | B60R 21/233 280/729 |
| 8,690,185 B2 * | 4/2014 | Yamaji | B60R 21/233 280/729 |
| 2005/0173897 A1 | 8/2005 | Abe et al. | |
| 2006/0197320 A1 | 9/2006 | Abe | |
| 2014/0239617 A1 | 8/2014 | Dix | |
| 2016/0250993 A1 | 9/2016 | Nagatani et al. | |
| 2017/0057453 A1 | 3/2017 | Morris et al. | |

FOREIGN PATENT DOCUMENTS

| | | | |
|---|---|---|---|
| DE | 29518651 | 4/1996 | |
| DE | 10333991 | 3/2005 | |
| FR | 2724350 | 3/1996 | |
| FR | 2724350 A1 * | 3/1996 | |
| GB | 1455482 A * | 11/1976 | ........... B60R 21/231 |

* cited by examiner

200~# AIRBAG AND AIRBAG MODULE FOR A MOTOR VEHICLE HAVING SUCH AN AIRBAG

RELATED APPLICATIONS

This application corresponds to PCT/EP2019/0055504, filed Mar. 6, 2019, which claims the benefit of German Application No. 20 2018 101 242.8, filed Mar. 6, 2018, the subject matter of which are incorporated herein by reference in their entirety.

BACKGROUND OF THE INVENTION

The invention relates to an airbag for unfolding between a vehicle part, especially a vehicle steering wheel rotatable about a steering axis, and a vehicle occupant as well as to an airbag module having such an airbag.

The efforts directed to automated or autonomous driving entail new requirements even in the field of the vehicle safety devices. For example, the driver needs no longer be seated in his/her currently usual active driving position, but may take at least temporarily a passive passenger position in which the seat and/or the backrest is/are reclined for the purpose of relaxing.

A conventional driver airbag designed for the active driving position does not provide optimum protection in said passive passenger position in the event of crash and, on the new boundary conditions, has a certain potential of improvement.

SUMMARY OF THE INVENTION

Therefore, it is the object of the invention to provide an airbag that provides a restraining action adapted to the sitting position and thus satisfactory occupant protection with little effort both in an active driving position and in a passive passenger position of the driver.

In accordance with the invention, said object is achieved by an airbag for unfolding between a vehicle part, especially a vehicle steering wheel rotatable about a steering axis, and a vehicle occupant, comprising an impact wall which, in the installed and unfolded state of the airbag, faces the vehicle occupant, and a circumferential wall which is connected to the impact wall and, in the installed and unfolded state of the airbag, extends between the impact wall and the vehicle part, wherein the circumferential wall is made with multiple layers at least in sections and forms at least one annular tube which delimits an annular inflatable first airbag volume, and wherein a radially inner layer of the circumferential wall together with the impact wall delimits an inflatable second airbag volume that is separate from the first airbag volume. The geometry and/or the hardness of the airbag can be adapted with little effort to a sitting position of the occupant via the two different airbag volumes. When inflating the first airbag volume, for example a first airbag configuration adapted to the active driving position of the occupant that is rather close to the steering wheel is resulting, while, when inflating the second airbag volume, a second airbag configuration different from the first airbag configuration is resulting which is adapted, for example, to the passive passenger position of the occupant that is rather "distant from the steering wheel".

In this case, the fact that the first airbag volume is separate from the second airbag volume in other words means that there is no flow communication between the two airbag volumes. When unfolding the airbag, generator gas is optionally supplied to the first airbag volume or to the second airbag volume, namely via a first airbag orifice associated with the first airbag volume and, resp., via a second airbag orifice different from the first airbag orifice and associated with the second airbag volume. After inflating the first or second airbag volume, overflow of generator gas into the other airbag volume is no longer possible due to the separation of the two airbag volumes.

It is preferred that, when the first airbag volume is inflated, the at least one annular tube has a substantially circular annular cross-section and is subjected to axial tensile load, when the second airbag volume is inflated, so that the radially inner layer and a radially outer layer of the circumferential wall are adjacent to each other, especially abut on each other, and extend substantially in the axial direction. The circular annular tube cross-section then has a shorter axial dimension of the circumferential wall than the elongate annular tube cross-section. Consequently, depending on the inflated airbag volume, an axial distance between the vehicle part and the impact wall can advantageously be varied.

In one embodiment of the airbag, when the second airbag volume is inflated, an axial distance between the impact wall and the vehicle part is larger, preferably by a factor of at least 1.3, than when the first airbag volume is inflated. If the vehicle part is a vehicle steering wheel, said distance is concretely dimensioned between the impact wall and a steering wheel plane spanned by the steering wheel rim of the vehicle steering wheel. Preferably, the impact wall extends approximately in parallel to the steering wheel plane.

Furthermore, the second airbag volume may be larger, especially 1.5 times to twice as large as the first airbag volume. With the same amount of gas available, consequently for the inflated second airbag volume the internal pressure is less than for the inflated first airbag volume. This is especially uncritical or even desired, however, when the inflated second airbag volume also has a larger axial dimension and thus provides a larger immersing depth for the vehicle occupant. Said larger immersing depth with a lower internal pressure ultimately means a "gentler" restraint for the occupant.

Preferably, tethers extend across the second airbag volume and connect respective opposite portions of the circumferential wall, concretely speaking opposite portions of the respective inner layer of the multi-layer circumferential wall. The tethers are arranged especially in one or more planes normal to the steering axis in star-shape so as to obtain an approximately cylindrical airbag shape when inflating the second airbag volume.

According to another embodiment of the airbag, the circumferential wall forms plural annular tubes arranged in series in the axial direction which are in flow communication with one another. In this way, the difference between the axial airbag dimensions can be increased with little effort when filling the first and, resp., the second airbag volume without having to increase the amount of generator gas made available.

In this embodiment of the airbag, in the circumferential wall suitable seams for subdivision into plural annular tubes may be provided.

Preferably, the vehicle part is a vehicle steering wheel rotatable about a steering axis, the annular tube enclosing the steering axis in the installed and unfolded state of the airbag. In this way, a driver-side occupant restraint can be adapted to the distance of the driver from the steering wheel with little effort. This is especially advantageous for vehicles that include, apart from a manual driving mode, also an autonomous driving mode, as the driver's distance from the steering wheel in this case varies definitely more strongly than in vehicles having no autonomous driving mode.

In general, merely a reliable support of the inflated airbag must be ensured in the case of restraint, however. Accordingly, the vehicle part may also be any other suitable support members inside the vehicle, especially a portion of an instrument panel. Analogously to the steering wheel rim of the vehicle steering wheel, the airbag then can bear against a flat, optionally slightly bulged portion of the instrument panel, for example. Thus, also a passenger-side occupant restraint can be adapted with little effort to the distance of the front passenger from the instrument panel.

For the rest, the invention also comprises an airbag module for a motor vehicle, comprising an afore-described airbag, a gas generator for inflating the airbag and a control unit for activating the gas generator, especially an electronic control unit, wherein boundary conditions for applying generator gas to the first airbag volume or the second airbag volume are deposited in the control unit. This has to be understood to the effect that generator gas is optionally applied either to the first airbag volume or to the second airbag volume and both airbag volumes are never inflated simultaneously.

According to one embodiment of the airbag module, the gas generator is a single-stage design and, upon activation thereof, releases exactly a predetermined amount of gas which can optionally be supplied to the first airbag volume or to the second airbag volume. Thus, a comparatively complicated two-stage design of the gas generator is dispensed with. This is easily possible especially when in the case of different first and second airbag volumes the larger airbag volume also has a larger airbag depth. Although the lower internal pressure of the larger airbag volume formed when the same amount of gas is injected then results in a larger immersing depth of the occupant, this is not detrimental due to the larger axial extension of the airbag volume, however, but even results rather in "gentler" occupant restraint.

In this embodiment, preferably a gas guide means is provided which can be adjusted by the control unit so that it optionally supplies released generator gas to the first airbag volume or to the second airbag volume.

According to an alternative embodiment of the airbag module, the gas generator is a two-stage design and a separate gas outlet is associated with each generator stage, the first airbag volume being connected to the gas outlet of a first generator stage and the second airbag volume being connected to the gas outlet of a second generator stage. As compared to single-stage gas generators, two-stage gas generators require a larger space and manufacture thereof is more complicated and more expensive. On the other hand, however, no compromise is necessary for determining a uniform amount of gas for filling the two differently large airbag volumes. Rather, the released amount of gas of the respective generator stage can be individually adapted to the size of the associated airbag volume and a desired restraining action. Even with this embodiment it is emphasized that always either the first generator stage for filling the first airbag volume or the second generator stage for filling the second airbag volume is activated. In this case, too, the two airbag volumes that are separate from each other are never inflated simultaneously. However, a design variant would be imaginable in which the generator gas of the first generator stage can optionally be supplied to the first airbag volume or to the second airbag volume analogously to the generator gas of an afore-described single-stage gas generator. The generator gas of the second generator stage then serves merely as an additional gas and is associated with the airbag volume for application of which a larger amount of gas is desired. Consequently, this airbag volume then can be filled with the generator gas of both generator stages or the other airbag volume can be filled with the generator gas of the first generator stage only.

BRIEF DESCRIPTION OF THE DRAWINGS

Further features and advantages of the invention will be evident from the following description of a preferred embodiment with reference to the drawings, wherein.

DESCRIPTION

Figure 1:
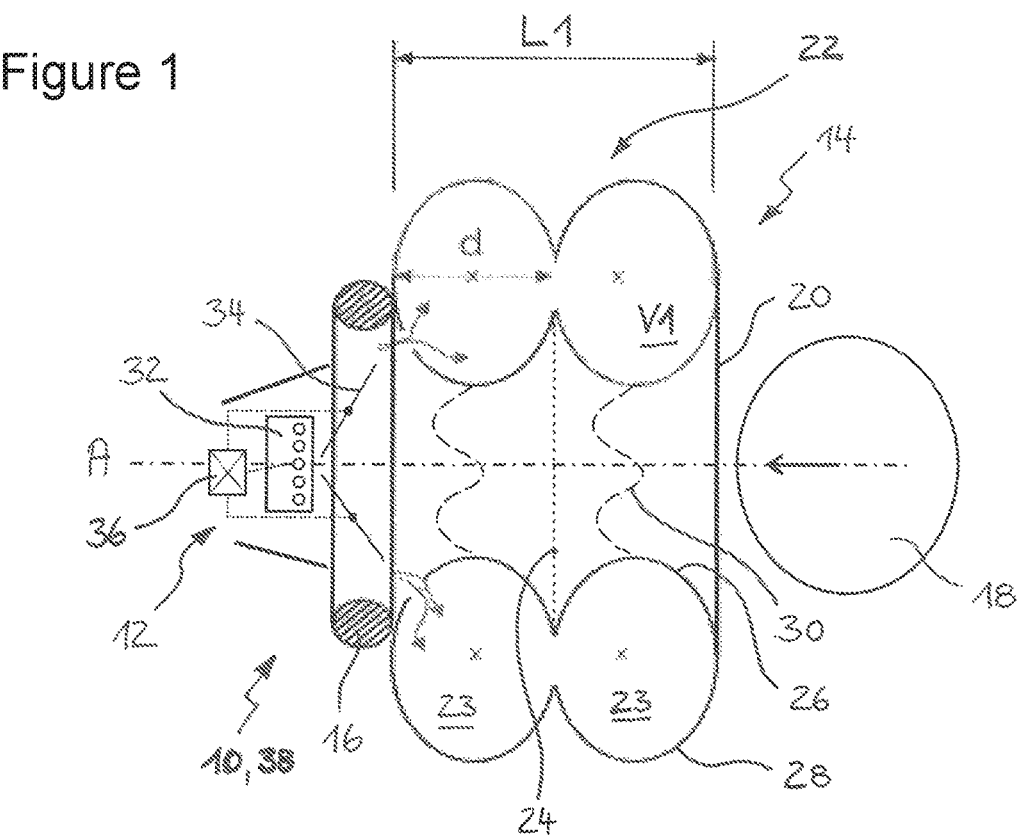
FIG. 1 shows a schematic section across an airbag module according to the invention in which a first airbag volume of an airbag according to the invention is inflated.
Figure 2:
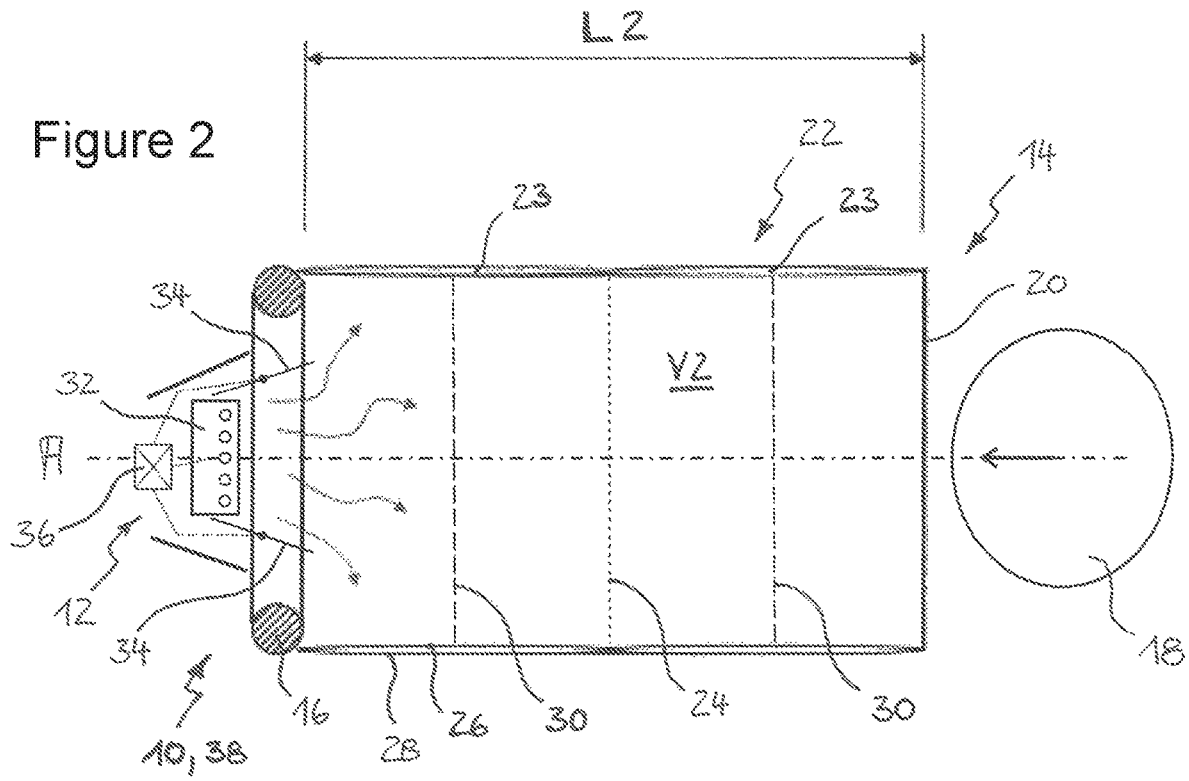
FIG. 2 shows another schematic section across the airbag module according to FIG. 1 in which a second airbag volume of the airbag is inflated.

In FIGS. 1 and 2, a vehicle steering wheel 38 rotatable about a steering axis A and comprising an airbag module 12 is shown, wherein the airbag module 12 includes an airbag 14 for deployment between a steering wheel rim 16 of the vehicle steering wheel 38 and a vehicle occupant 18.

The airbag 14 comprises an impact wall 20 which, in the installed and unfolded state of the airbag 14, faces the vehicle occupant 18 and a circumferential wall 22 which is connected to the impact wall 20 and, in the installed and unfolded state of the airbag 14, extends between the impact wall 20 and the vehicle steering wheel 38. The impact wall 20 and the circumferential wall 22 of the airbag 14 are made from flexible material, especially from a fabric.

The circumferential wall 22 is made in multiple layers at least in sections and forms at least one annular tube 23 which encloses the steering axis A and delimits an annular inflatable first airbag volume V1. In the illustrated example configuration, the entire circumferential wall 22 is made in two layers and forms two torus-shaped annular tubes 23 arranged in series in the axial direction which are in flow communication with each other.

As indicated as a dotted line in FIGS. 1 and 2, in the circumferential wall 22 suitable seams 24 or darts are provided to subdivide the first airbag volume V1 into individual annular tubes 23.

Further, a radially inner layer 26 of the multi-layered circumferential wall 22 together with the impact wall 20 delimits an inflatable second airbag volume V2 which is separate from the first airbag volume V1.

Each annular tube 23 has an approximately circular tube cross-section when the first airbag volume V1 is inflated according to FIG. 1, whereas the annular tubes 23 are subjected to axial tensile load when the second airbag volume V2 is inflated according to FIG. 2, so that each of the radially inner layer 26 and a radially outer layer 28 of the circumferential wall 22 abut on each other and extend substantially in the axial direction. In other words, the flexible annular tubes 23 are inflated to form a torus when the first airbag volume V1 is inflated and are pulled apart as far as possible in the axial direction by the internal airbag pressure when the second airbag volume V2 is filled.

An axial distance L2 between the impact wall 20 and the vehicle steering wheel 38, concretely speaking between the impact wall 20 and a plane spanned by the steering wheel rim 16 of the vehicle steering wheel 38 when the second airbag volume V2 is inflated, is larger, especially by a factor of about 1.5, than an axial distance L1 between the impact wall 20 and the vehicle steering wheel 38 when the first airbag volume V1 is inflated.

Accordingly, the first airbag volume V1 may be associated with an active driving position and the second airbag volume V2 may be associated with a passive passenger position of the vehicle occupant 18, wherein the position of the vehicle occupant 18 is determined, for example, by detecting the seat settings or optically by a camera.

In theory, for the illustrated example configuration with two superimposed exactly circular annular tubes 23 values of L1=2d and L2=πd are resulting, wherein d stands for the diameter of an annular tube 23. This corresponds to a factor of 1.57. The diameters of the individual annular tubes 23 are identical here, with configuration variants having different annular tube diameters naturally being also imaginable, however.

If the theoretic value L2=πd is to be approximately reached, the second airbag volume V2 must have a preferably cylindrical design. Therefore, as indicated in broken lines in FIGS. 1 and 2, there are provided tethers 30 extending across the second airbag volume V2 and connecting respective opposite sections of the inner layer 26 of the circumferential wall 22 so as to prevent, jointly with the seams 24, excessive "axial bulging" of the circumferential wall 22 when the second airbag volume V2 is inflated.

A configuration variant in which plural tethers 30 extend at least at one predetermined axial position substantially in a plane normal to the steering axis A has turned out to be especially advantageous, wherein the tethers are disposed star-shaped in an axial top view and are evenly distributed over the periphery. While the tethers 30 have no function when the first airbag volume V1 is filled and, according to FIG. 1, extend slackly across the (unfilled) second airbag volume V2, the tethers 30 are tensioned when the second airbag volume V2 is filled and, according to FIG. 2, define the diameter of the substantially cylindrical airbag 14.

An approximately circular-cylindrical second airbag volume V2 is formed which, as compared to the first airbag volume V1, has a definitely larger axial dimension and a somewhat smaller maximum outer diameter. Depending on the selection of the tube diameter d and the outer airbag diameter, the second airbag volume V2 is larger, especially about 1.5 to twice as large as the first airbag volume V1.

Apart from the afore-described airbag 14, the airbag module 12 further comprises a gas generator 32 for inflating the airbag 14 as well as an electronic control unit 36 for activating the gas generator 32, parameters for applying generator gas to the first airbag volume V1 or to the second airbag volume V2 being deposited in the electronic control unit 36. The decision to inflate the first or second airbag volume V1, V2 is made, for example, depending on parameters such as the current seat setting or an optically detected sitting position of the vehicle occupant 18 which then are compared to corresponding reference parameters deposited in the electronic control unit 36.

The gas generator 32 in the present example configuration according to FIGS. 1 and 2 is a single-stage design and thus, upon activation thereof, generates exactly a predetermined amount of gas which can optionally be supplied to the first airbag volume V1 or to the second airbag volume V2. For this purpose, the airbag module 12 includes a gas guiding means 34 schematically indicated in the Figures which is adjustable via the electronic control unit 36 so that it introduces released generator gas optionally to the first airbag volume V1 or to the second airbag volume V2.

When filling the larger second airbag volume V2, this results in a lower airbag internal pressure than in the case of filling the smaller first airbag volume V1 and thus in a larger immersing depth of the vehicle occupant 18, when the latter impacts on the impact wall 20 of the airbag 14. The larger immersing depth is uncritical in this case, however, because the second airbag volume V2 in the present example configuration also has a larger axial dimension than the first airbag volume V1.

As an alternative, it is also imaginable, however, to design the gas generator 32 with two stages and to associate a separate gas outlet to each generator stage, the first airbag volume V1 being connected to the gas outlet of a first generator stage and the second airbag volume V2 being connected to the gas outlet of a second generator stage. Depending on the detected occupant position, then the electronic control unit 36 activates the first generator stage for inflating the first airbag volume V1 or the second generator stage for inflating the second airbag volume V2, wherein the amount of gas released of the respective generator stage can be individually adapted to the size of the associated airbag volume V1, V2 and to a desired restraining action.

Further, instead of a two-stage gas generator 32, also two separate (single-stage) gas generators 32 can be used, of course, with an airbag volume V1, V2 being associated to each gas generator 32.

The airbag module 12 shown in FIGS. 1 and 2 is an exemplified driver-side airbag module 12 comprising a driver airbag that bears against the vehicle steering wheel 38. Instead of bearing against the vehicle steering wheel 38, the airbag 14 may also bear against another vehicle part 10 such as an instrument panel, for example. In this case, the airbag module 12 then would be arranged especially on the passenger side and the airbag 14 would be a passenger airbag. Furthermore, the vehicle part 10 may also be a vehicle seat, concretely speaking the backrest of a vehicle seat, with the airbag 14 then being provided for protecting occupants in the second or third row. The seats of the occupants in the second or third row are adjustable especially as to their position or inclination so that in this case, too, adaptivity of the depth of the airbag 14 is of advantage.

Unless the airbag 14 bears against a substantially circular steering wheel rim 16 of the vehicle steering wheel 38, the airbag 14 need not be circular, when viewed in the impacting direction of the occupant to be protected, but may be adapted to the respective bearing face of the vehicle part 10 and may be, for example, oval or almost rectangular (with rounded corners).

In general, the airbag module 12 can be used inside the vehicle wherever adaptivity of the depth of the airbag 14 is desired and a suitable vehicle part 10 is provided for supporting the airbag 10.

The invention claimed is:

1. An airbag for unfolding between a vehicle part (10) and a vehicle occupant (18), comprising
    an impact wall (20) which, in an installed and unfolded state of the airbag (14), faces the vehicle occupant (18), and
    a circumferential wall (22) which is connected to the impact wall (20) and, in the installed and unfolded state of the airbag (14), extends between the impact wall (20) and the vehicle part (10), wherein the circumferential wall (22) is made with multiple layers at least in sections and forms at least one annular tube (23) which delimits an annular inflatable first airbag volume (V1), wherein a radially inner layer (26) of the circumferential wall (22) together with the impact wall (20) delimits an inflatable second airbag volume (V2) that is separate from the first airbag volume (V1), and wherein an axial distance (L) between the impact wall (20) and the vehicle part (10) is larger when the second airbag volume (V2) is inflated than when the first airbag volume (V1) is inflated.

2. The airbag according to claim 1, wherein when the first airbag volume (V1) is inflated, the at least one annular tube (23) has a substantially circular tube cross-section and, when the second airbag volume (V2) is inflated, is subjected to axial tensile load so that the radially inner layer (26) and a radially outer layer (28) of the circumferential wall (22) are adjacent to each other and extend substantially in an axial direction.

3. The airbag according to claim 1, wherein the second airbag volume (V2) is larger than the first airbag volume (V1).

4. The airbag according to claim 1, wherein tethers (30) extend across the second airbag volume (V2) and connect respective opposite sections of the circumferential wall (22).

5. The airbag according to claim 1, wherein the circumferential wall (22) forms plural annular tubes (23) arranged in series in an axial direction which are in flow communication with one another.

6. The airbag according to claim 1, wherein seams (24) suited for subdivision into plural annular tubes (23) are provided in the circumferential wall (22).

7. The airbag according to claim 1, wherein the vehicle part (10) is a vehicle steering wheel (38) rotatable about a steering axis (A), wherein the annular tube (23) in the installed and unfolded state of the airbag (14) encloses the steering axis (A).

8. An airbag module for a motor vehicle, comprising
an airbag (14) according to claim 1,
a gas generator (32) for inflating the airbag (14), and
a control unit (36) for activating the gas generator (32),
wherein boundary conditions for applying generator gas to the first airbag volume (V1) or to the second airbag volume (V2) are deposited in the control unit (36).

9. The airbag module according to claim 8, wherein the gas generator (32) is a single-stage design and, upon activation thereof, releases a predetermined amount of gas which can optionally be supplied to the first airbag volume (V1) or to the second airbag volume (V2).

10. The airbag module according to claim 9, wherein a gas guiding means (34) is provided which is adjustable via the control unit (36) so that it supplies released generator gas optionally to the first airbag volume (V1) or to the second airbag volume (V2).

11. An airbag module for a motor vehicle, comprising
an airbag (14),
a gas generator (32) for inflating the airbag (14), and
a control unit (36) for activating the gas generator (32),
wherein the airbag comprises:
an impact wall (20) which, in an installed and unfolded state of the airbag (14), faces a vehicle occupant (18), and a circumferential wall (22) which is connected to the impact wall (20) and, in the installed and unfolded state of the airbag (14), extends between the impact wall (20) and a vehicle part (10), wherein the circumferential wall (22) is made with multiple layers at least in sections and forms at least one annular tube (23) which delimits an annular inflatable first airbag volume (V1), wherein a radially inner layer (26) of the circumferential wall (22) together with the impact wall (20) delimits an inflatable second airbag volume (V2) that is separate from the first airbag volume (V1), and wherein boundary conditions for applying generator gas to the first airbag volume (V1) or to the second airbag volume (V2) are deposited in the control unit (36).

12. The airbag module according to claim 11, wherein when the first airbag volume (V1) is inflated, the at least one annular tube (23) has a substantially circular tube cross-section and, when the second airbag volume (V2) is inflated, is subjected to axial tensile load so that the radially inner layer (26) and a radially outer layer (28) of the circumferential wall (22) are adjacent to each other and extend substantially in an axial direction.

13. The airbag module according to claim 11, wherein an axial distance (L) between the impact wall (20) and the vehicle part (10) is larger when the second airbag volume (V2) is inflated than when the first airbag volume (V1) is inflated.

14. The airbag module according to claim 11, wherein the second airbag volume (V2) is larger than the first airbag volume (V1).

15. The airbag module according to claim 11, wherein tethers (30) extend across the second airbag volume (V2) and connect respective opposite sections of the circumferential wall (22).

16. The airbag module according to claim 11, wherein the circumferential wall (22) forms plural annular tubes (23) arranged in series in an axial direction which are in flow communication with one another.

17. The airbag module according to claim 11, wherein seams (24) suited for subdivision into plural annular tubes (23) are provided in the circumferential wall (22).

18. The airbag module according to claim 11, wherein the vehicle part (10) is a vehicle steering wheel (38) rotatable about a steering axis (A), wherein the annular tube (23) in the installed and unfolded state of the airbag (14) encloses the steering axis (A).

19. The airbag module according to claim 11, wherein the gas generator (32) is a single-stage design and, upon activation thereof, releases a predetermined amount of gas which can optionally be supplied to the first airbag volume (V1) or to the second airbag volume (V2).

20. The airbag module according to claim 19, wherein a gas guiding means (34) is provided which is adjustable via the control unit (36) so that it supplies released generator gas optionally to the first airbag volume (V1) or to the second airbag volume (V2).

* * * * *